US012296830B1

(12) United States Patent
Maffei et al.

(10) Patent No.: US 12,296,830 B1
(45) Date of Patent: May 13, 2025

(54) DRIVE AXLE SYSTEM AND METHOD FOR DETERMINING PINION GEAR TORQUE

(71) Applicant: DANA ITALIA S.R.L., Trentino (IT)

(72) Inventors: Claudio Maffei, Arco (IT); Efrem Rusconi, Arco (IT); Andrea Bolza, Arco (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 18/425,802

(22) Filed: Jan. 29, 2024

(51) Int. Cl.
| | |
|---|---|
| *B60W 30/188* | (2012.01) |
| *B60W 10/12* | (2012.01) |
| *B60W 10/20* | (2006.01) |
| *F16H 48/05* | (2012.01) |

(52) U.S. Cl.
CPC .......... *B60W 30/188* (2013.01); *B60W 10/12* (2013.01); *B60W 10/20* (2013.01); *B60W 2510/12* (2013.01); *F16H 48/05* (2013.01)

(58) Field of Classification Search
CPC . B60W 30/188; B60W 2510/12; B60W 10/12
See application file for complete search history.

(56) References Cited

U.S. PATENT DOCUMENTS

| | | | | |
|---|---|---|---|---|
| 5,373,912 | A | * | 12/1994 | Haiki ................. B60K 23/0808 477/35 |
| 10,067,015 | B2 | | 9/2018 | Lee et al. |
| 2011/0174557 | A1 | * | 7/2011 | Tanba ................... B60W 10/02 903/902 |
| 2015/0211619 | A1 | * | 7/2015 | Cooper ................... F16H 48/30 475/231 |
| 2017/0122821 | A1 | * | 5/2017 | Pietron ............... B60K 17/344 |
| 2021/0229679 | A1 | * | 7/2021 | Gießibl ............... B60W 10/119 |

FOREIGN PATENT DOCUMENTS

CN 104634588 B 3/2017

\* cited by examiner

*Primary Examiner* — Tinh Dang
(74) *Attorney, Agent, or Firm* — McCoy Russell LLP

(57) ABSTRACT

Systems and methods for a drive axle. The drive axle system, in one example, includes a displacement sensor coupled to a pinion input flange and configured to generate axial displacement data corresponding to the pinion input flange, where the pinion input flange is directly coupled to an angled pinion gear. The drive axle system further includes a controller configured to determine a torque at the pinion input flange based on the axial displacement data.

19 Claims, 5 Drawing Sheets

DRIVE AXLE SYSTEM AND METHOD FOR DETERMINING PINION GEAR TORQUE

TECHNICAL FIELD

The present description relates to a drive axle system. More particularly, the description relates to a technique for determining torque applied to an input flange of a pinion gear.

BACKGROUND AND SUMMARY

Drivelines are included in certain vehicles. The drivelines receive mechanical power from an engine or an electric motor in different powertrain architectures. Some vehicle control strategies demand torque readings at targeted locations in the driveline.

U.S. Pat. No. 10,067,015 B2 to Lee et al. discloses a torque sensor which is located at a connection between an input shaft and an output shaft. The torque sensor utilizes a complex construction with a magnetic field generator, a collector which detects the magnetic field, and a shield ring that is positioned between the magnetic field generator and the collector, among other features.

The inventors have recognized several issues with Lee's torque sensor device and other previous torque sensors and corresponding systems. Magnetic and other types of torque sensors may be complex and costly to deploy in some vehicles. More generally, the inventors have recognized a need to provide a less complex torque sensing device that can be quickly and effectively incorporated into a variety of vehicle platforms. The inventors have also recognized a need to efficiently determine mechanical power transmitted to drive axles.

To overcome the abovementioned challenges, the inventors developed a drive axle system to at least partially overcome the challenges. The drive axle system includes, in one example, includes a displacement sensor that is coupled to a pinion input flange and configured to generate axial displacement data which corresponds to the pinion input flange that is directly coupled to an angled pinion gear. The drive axle system further includes a controller that is configured to determine a torque at the pinion input flange based on the axial displacement data. Further, in the drive axle system, the pinion input flange is positioned external to a differential housing. In this way, the torque applied to the pinion gear can be quickly and efficiently determined using an axial displacement sensor which can be more efficiently installed in the drive axle due to its location.

Further in one example, the drive axle system includes an angular speed sensor that is coupled to the pinion input flange and configured to generate angular speed data which is associated with the pinion input flange. In such an example, the angled pinion gear meshes with a ring gear in a differential and the controller is configured to determine a power transmitted through the pinion input flange based on the torque and the speed of the pinion input flange. Consequently, the power transmitted through the pinion input flange is able to be efficiently calculated using a group of sensors that can be effectively incorporated into a wide variety of vehicle platforms without undue machining, if desired.

It should be understood that the summary above is provided to introduce, in simplified form, a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A drive axle system is described herein that is configured to determine a torque applied to a pinion input flange (which is arranged in a driveline) using an axial displacement of the pinion input flange identified by a displacement sensor that is attached to the flange. From this torque determination, the power transmitted through the pinion input flange can be calculated based on the product of the torque and an angular speed of the pinion input flange which is determined by an angular speed sensor that is attached to the pinion input flange or the displacement sensor. Using a displacement sensor in the system allows the complexity of the system to be reduced when compared to vehicle systems that use more complex torque sensors such as magnetic torque sensors. The pinion input flange is positioned external to a differential housing. In this way, the sensors can be quickly and efficiently attached to the flange, thereby increasing manufacturing efficiency. Further, both the displacement sensor and the angular speed sensor may be coupled to the pinion input flange without the need to machine components, further increasing system manufacturing efficiency and increasing the system's applicability to a wider variety of vehicle platforms.

Figure 1:
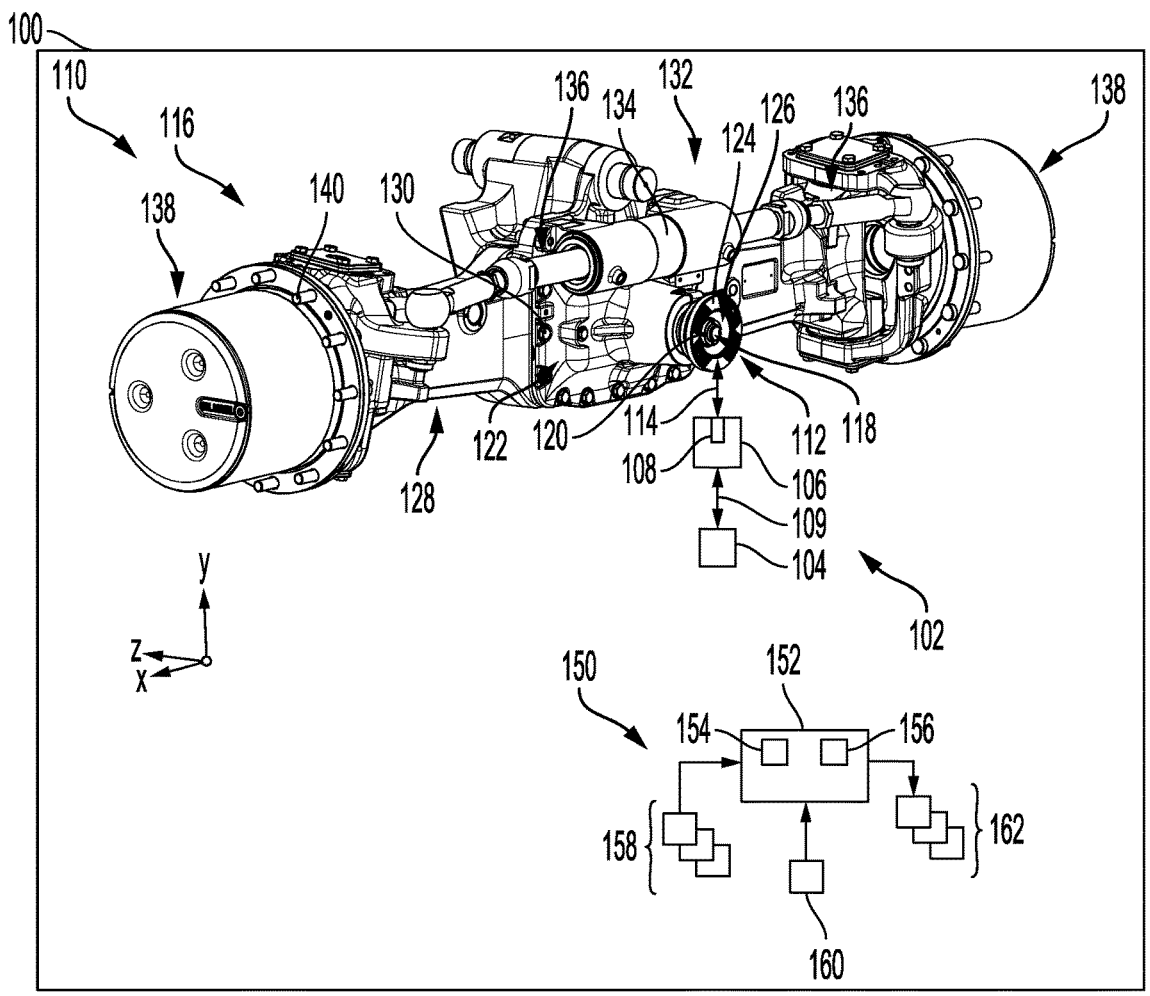
FIG. 1 shows a vehicle with a drive axle system.

FIG. 1 shows a vehicle 100 with a powertrain 102. The powertrain 102 includes a prime mover 104 that is rotationally coupled to a drivetrain 106 with a driveline 108, as denoted via arrows 109. The drivetrain 106 and more specifically the driveline 108 is rotationally connected to a drive axle system 110 and specifically a pinion input flange 112 as denoted by arrows 114. The mechanical connection between the driveline 108 and the drive axle system 110 is elaborated upon herein. The drive train 106 may include a transmission (e.g., a multi-speed transmission).

The vehicle 100 may take a variety of forms such as a light, medium, or heavy duty vehicle. Further, the prime mover 104 may be an internal combustion engine, in one example. In another example, the prime mover 104 may be an electric motor (e.g., a traction motor). Still further, in other examples, the powertrain may include both an internal combustion engine and an electric motor. Thus, the vehicle 100 may be a hybrid electric vehicle in one example, an all-electric vehicle in yet another example, or an internal combustion engine vehicle in yet another example.

The drive axle system 110 includes a drive axle assembly 116. The drive axle system 110 includes the pinion input flange 112 which is directly coupled to an angled pinion gear 118. To elaborate, in the illustrated example, the pinion input flange 112 is directly coupled to a shaft 120 of the angled pinion gear 118 at a location external to a differential housing 122.

The pinion input flange 112 includes an outboard face 124 that is profiled to attach to a suitable component in the driveline 108 such as a shaft, a joint, and the like. To elaborate, the outboard face 124 of the flange includes planar sections in the illustrated example. However, the outboard face 124 may have alternate contours, in other examples. The outboard face 124 may include attachment device openings and/or other suitable structural features that allow the pinion input flange 112 to be attached to upstream components, discussed in greater detail herein with regard to FIG. 2. Further in the illustrated example, the pinion gear shaft 120 includes a section that is positioned within an opening 126 of a section of the pinion input flange 112. However, other pinion gear constructions have been contemplated.

The differential housing 122 may be removably coupled to an axle shaft housing 128. Attachment devices 130 (e.g., fasteners such as bolts or other suitable devices) may be used to removably attach the differential housing 122 and the axle shaft housing 128. A differential may be enclosed within the enclosure formed between the differential housing 122 and the axle shaft housing 128. Further, the differential housing 122 encloses a toothed section of the angled pinion gear 118, which is discussed in greater detail herein with regard to FIG. 3. The differential housing 122 therefore may serve as an access panel form internal components in the axle such as the angled pinion gear 118, a differential discussed in greater detail herein, and the like. The differential is configured to transmit mechanical power to axle shafts and provide speed differentiation between the axle shafts during certain operating conditions.

The drive axle system 110 further includes a steering assembly 132, in the illustrated example. Thus, the drive axle system 110 may be a drive steer axle, in one example. However, in other examples, the drive axle may be a non-steering axle. The steering assembly 132 may include a steering cylinder 134 and steering linkage 136 which mechanically attaches the steering cylinder 134 to hub assemblies 138 to allow the pivot angle of wheels connected to the hubs to be altered based on operator input, for example. The steering linkage 136 may include shafts, joints, and the like to achieve the pivot angle adjustment functionality. Wheels may be coupled to the hub assemblies 138 via attachment devices 140.

Figure 3:
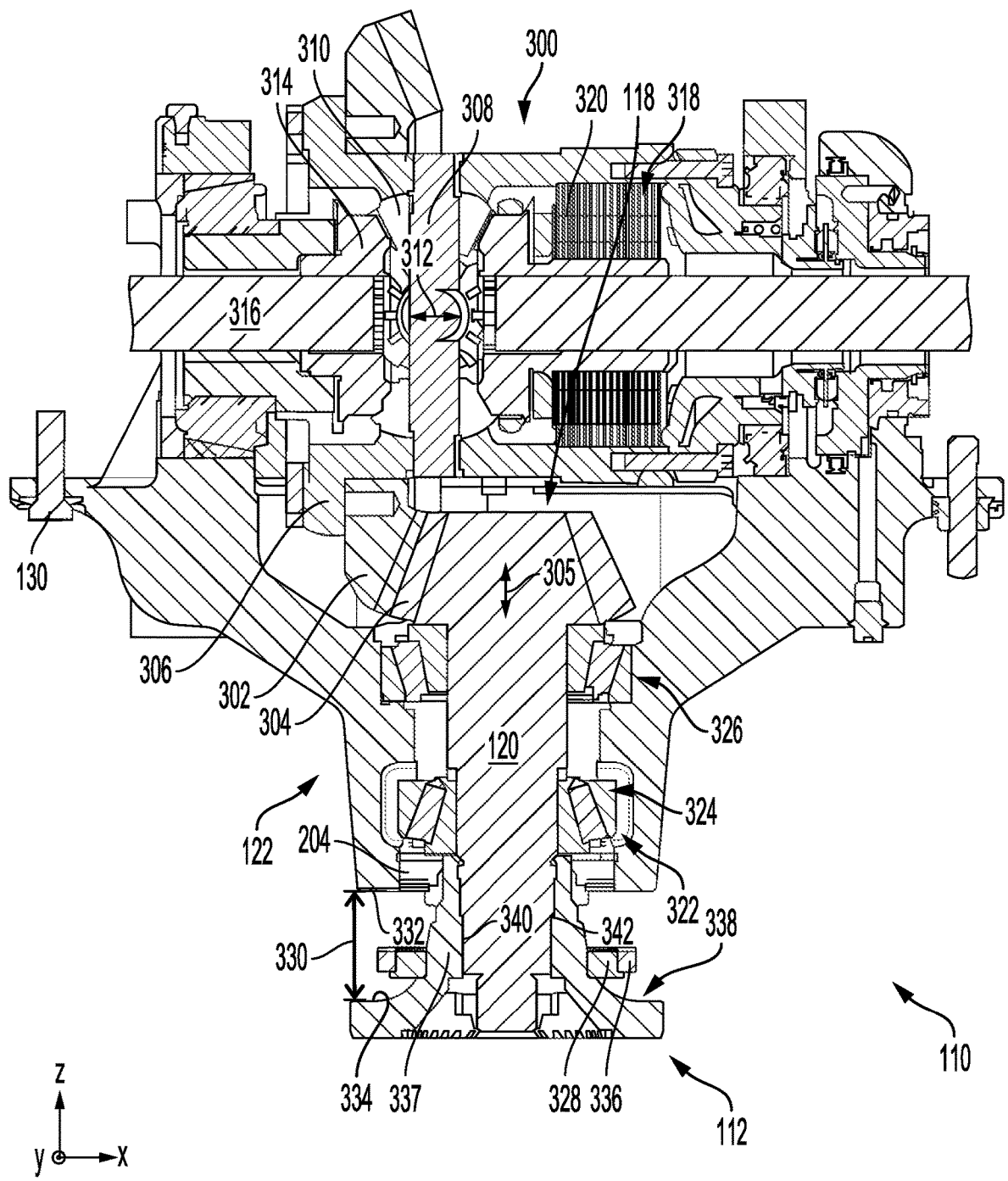
Figure 5:
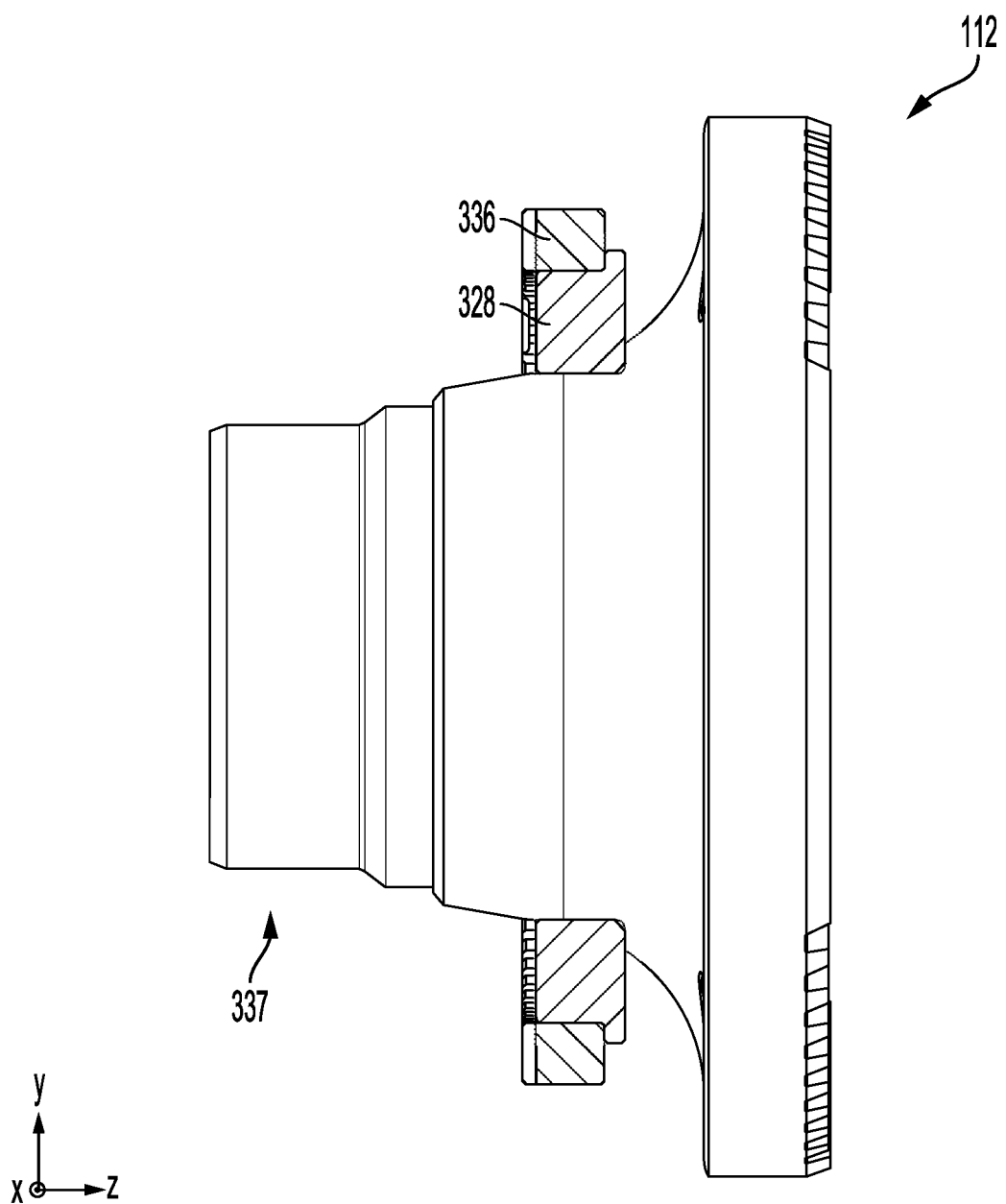
FIG. 5 shows a detailed view of a pinion input flange in the drive axle system, depicted in FIG. 1.

A pair of sensors, discussed in greater detail herein with regard to FIGS. 3 and 5, may be coupled to the pinion input flange 112. These sensors allow the mechanical power which is transmitted through the flange and to the angled pinion gear 118 to be efficiently determined using a sensor assembly that is efficient to install and is able to be installed in a wide variety of vehicle platforms due to the construction, thereby increasing the sensor assembly's applicability and customer appeal as a consequence.

As shown in FIG. 1, the vehicle 100 may further include a control system 150 with a controller 152. The controller 152 may include a microcomputer with components such as a processor 154 (e.g., a microprocessor unit), input/output ports, an electronic storage medium 156 for executable programs and calibration values, e.g., a read-only memory chip, random access memory, keep alive memory, a data bus, and the like. The storage medium may be programmed with computer readable data representing instructions which are executable by a processor for performing the methods, control techniques, and the like described herein as well as other variants that are anticipated but not specifically listed. Therefore, the electronic storage medium 156 may hold instructions stored therein that when executed by the processor 154 cause the controller 152 to perform the various method steps described herein.

The controller 152 may receive various signals from sensors 158 coupled to different regions of the vehicle 100 and specifically the drive axle system 110. For example, the sensors 158 may include an axial displacement sensor and an angular speed sensor (elaborated upon below), a pedal position sensor to detect a depression of an operator-actuated pedal (e.g., an accelerator pedal and/or a brake pedal), speed sensors in the powertrain, and the like. An input device 160 (e.g., accelerator pedal, brake pedal, gear selector, combinations thereof, and the like) may further provide input signals indicative of an operator's intent for vehicle control.

Upon receiving the signals from the various sensors 158 of FIG. 1, the controller 152 processes the received signals, and employs various actuators 162 of vehicle components to adjust the components based on the received signals and instructions stored on the memory of controller 152. For example, the controller 152 may receive an accelerator pedal signal indicative of an operator request for a vehicle acceleration adjustment. In response, the controller 152 may command operation the prime mover 104 to adjust the output of the prime mover. The other controllable components in the vehicle may function in a similar manner with regard to sensor signals, control commands, and actuator adjustment, for example.

An axis system is provided in FIG. 1, as well as FIGS. 2-5, for reference. The y-axis may be a vertical axis (e.g., parallel to a gravitational axis), the x-axis may be a lateral axis (e.g., horizontal axis), and the z-axis may be a longitudinal axis, in one example. However, in other examples, the axes may have other orientations.

Figure 2:
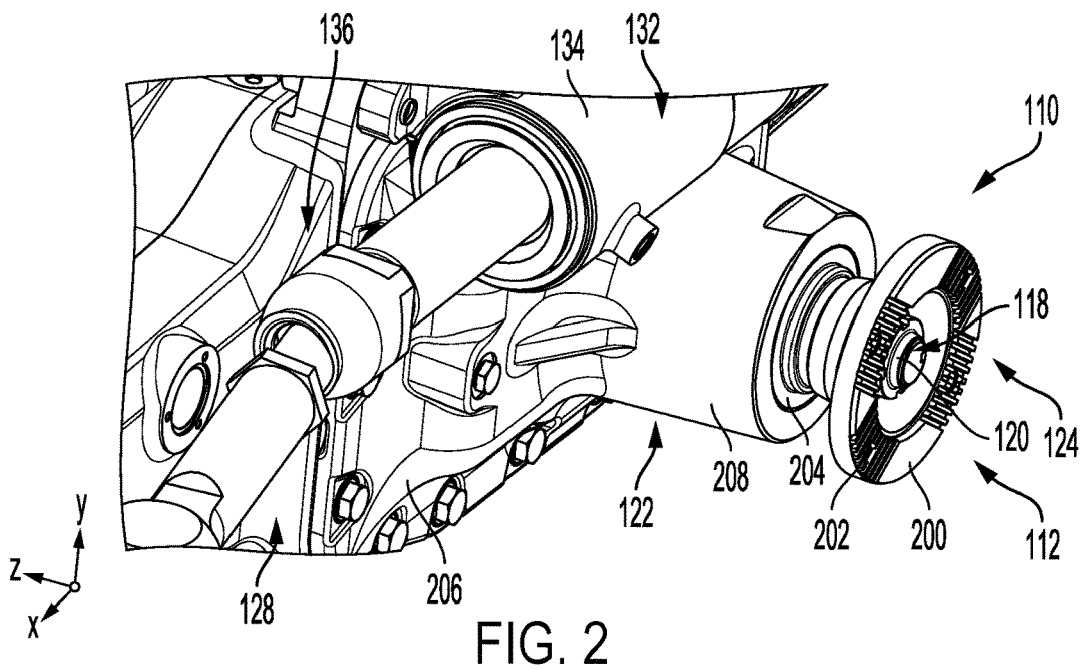
FIGS. 2-4 show different detailed views of the drive axle system, depicted in FIG. 1.

FIG. 2 shows a detailed view of the interface between the pinion input flange 112 and the shaft 120 of the angled pinion gear 118 in the drive axle system 110. The outboard face 124 of the pinion input flange 112 is again illustrated in FIG. 2. The outboard face 124 includes planar sections 200 and toothed sections 202 in the illustrated example. Additionally or alternatively, the flange may include openings, splines, and the like which facilitate attachment to the driveline. However, other suitable outboard face profiles may be used, in other examples. A rotary shaft seal 204 may be positioned between the shaft 120 of the angled pinion gear 118 and the differential housing 122. Further, the differential housing 122 may include a base 206 which attaches to the axle shaft housing 128 and an extension 208 which extends away from the base and is contoured to enclose the angled pinion gear 118 and a ring gear in a differential, in some instances. The steering assembly 132 with the steering cylinder 134 and the steering linkage 136 is again shown in FIG. 2.

FIG. 3 shows a cross-sectional view of the drive axle system 110. A differential 300 is depicted. The differential 300 includes a ring gear 302 that meshes with a toothed section 304 of the angled pinion gear 118. The toothed section 304 is angled with regard to a rotational axis 305 of the pinion gear 118.

The ring gear 302 is coupled to a differential case 306 which rotates a pinion gear shaft 308 with pinion gears 310 (e.g., spider gears) that are rotationally coupled thereto and rotate about an axis 312. The pinion gears 310 mesh with side gears 314 which are profiled (e.g., splined) to attach to axle shafts 316. This arrangement allows for speed differentiation between the side gears 314 and therefore axle shaft during certain operating conditions. In the illustrated example, the differential 300 includes a locking device 318 with plates 320 and other components that are configured to lock co-rotation of the side gears 314 when engaged. In this way, the differential 300 may be a locking differential which may be actively controlled to engage and disengage the locking device to increase the vehicle's tractive performance. However, another type of differential may be utilized, in other examples such as an open differential, a limited slip differential, a torque vectoring differential, and the like.

In the illustrated example, a pair of bearings 322 (which include bearings 324 and 326) is coupled to the pinion gear shaft 120 of the angled pinion gear 118. The bearings 324 and 326 are thrust bearings (e.g., spherical roller thrust bearings) in the illustrated example to support axial loads from the driveline and the ring gear 302. To expound, the bearings 324 and 326 are positioned to react load exerted in opposing axial directions, in the illustrated example.

An axial displacement sensor 328 is depicted in FIG. 3. The axial displacement sensor 328 is configured to generate axial displacement data that is indicative of an axial displacement 330 between the pinion input flange 112 caused by varying degrees of torque transmitted through the flange. To elaborate, the axial displacement 330 may be the axial distance between a surface 332 of the differential housing 122 and an inboard surface 334 of the pinion input flange 112. However, other suitable surfaces or locations in the housing and the flange may be used to determine the axial displacement. The axial displacement 330 is measured along an axis which is parallel to the z-axis, in the illustrated example. However, other orientations with regard to the axial displacement measurement are possible.

An angular speed sensor 336 is further depicted in FIG. 3. The angular speed sensor 336 is configured to generate angular speed data which is indicative of an angular speed of the pinion input flange 112 and therefore the pinion gear 118. The angular speed sensor 336 may either be directly coupled to the pinion input flange 112 or may be coupled to the flange via attachment to the displacement sensor, in different examples. Similarly, the axial displacement sensor 328 may be directly coupled to the pinion input flange 112 or may be coupled to the angular speed sensor 336 which is directly coupled to the pinion input flange 112. To elaborate, in the illustrated example, the axial displacement sensor 328 is directly coupled to a body 337 of the pinion input flange 112 and the angular speed sensor 336 is coupled to the outer circumference of the axial displacement sensor. However, in other examples, the angular speed sensor 336 may be directly coupled to the flange body 337 and the axial displacement sensor 328 may be directly coupled to the speed sensor.

The displacement sensor 328 and the angular speed sensor 336 are located outside of the differential housing 122. To elaborate, the displacement sensor 328 and the angular speed sensor 336 may be positioned between the outer surface 332 of the differential housing 122 and an inboard side 338 of the pinion input flange 112. In this way, the sensors are able to be more efficiently installed subsequent to assembly of the drive axle in relation to manufacturing. Further, the sensors may be installed without machining specific mounting structures in the drive axle, if desired. In this way, installation efficiency is increased and the system's applicability is increased.

In the illustrated example, the flange body 337 includes an interior surface 340 that is in face sharing contact with an outer circumferential surface 342 of the pinion gear shaft 120. Thus, the flange body circumferentially surrounds the pinion gear shaft. Specifically, the flange body may be press-fit to the pinion gear shaft, in one example. However, other suitable attachment techniques between the flange body and the pinion gear shaft have been contemplated such as welding or the components may be formed (e.g., machined) as a monolithic structure.

The rotary shaft seal 204 which may be optionally included in the drive axle system 110, is again depicted in FIG. 3. Further, the axle housing has been omitted in FIG. 3. However, it will be appreciated that attachment devices 130 may be used to attach the differential housing 122 to the axle housing.

Figure 4:
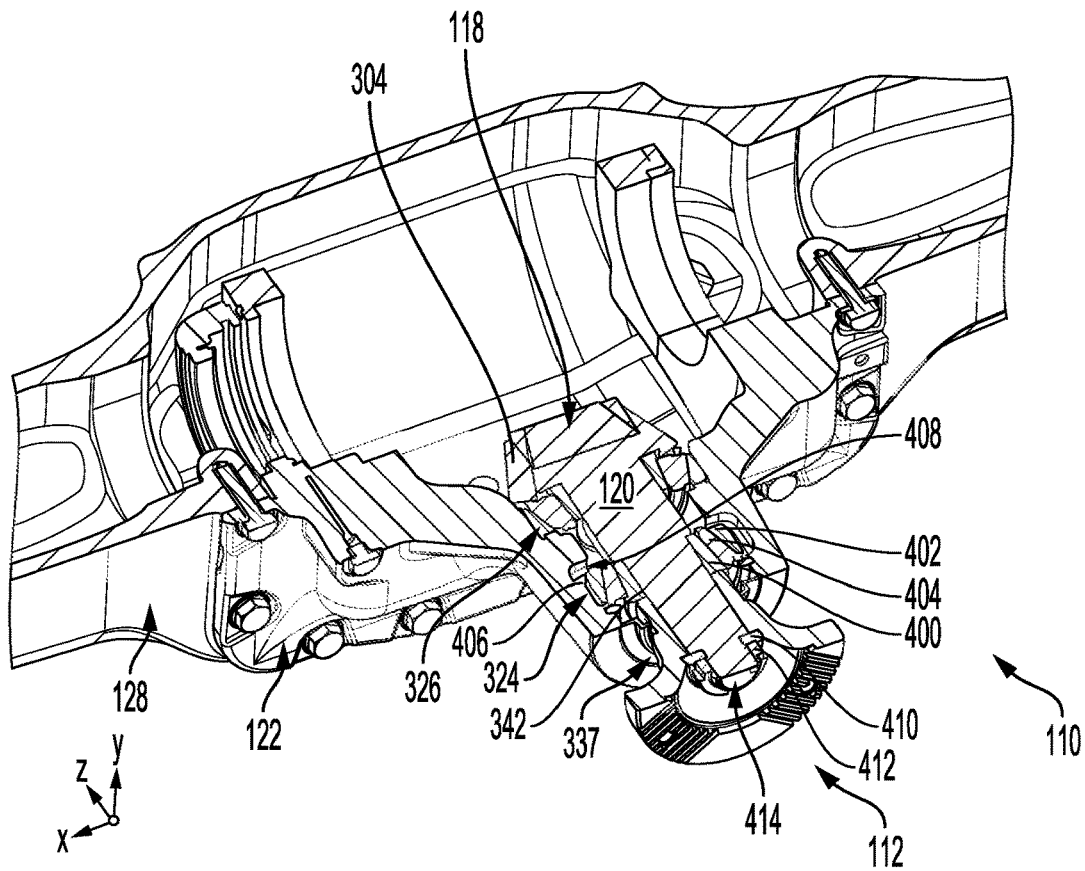

FIG. 4 shows a cross-sectional view of the drive axle system 110 with the differential omitted from the system to reveal the contours of other components in the system. The toothed section 304 of the angled pinion gear 118 is again depicted along with the pinion gear shaft 120. Additionally, the bearings 324 and 326, the differential housing 122, and the axle shaft housing 128 are again shown. Although, the sensors have been omitted from the system illustration in FIG. 4, it will be understood that the sensor are coupled to the pinion input flange 112 when the system is assembled.

The bearings 324 and 326 each include an inner race 400 and an outer race 402 with roller element 404 (e.g., tapered cylindrical rollers) positioned therebetween. The inner races 400 are in face sharing contact with the outer circumferential surface 342 of the pinion gear shaft 120. Conversely, the outer races 402 are in face sharing contact with an inner surface 406 of the differential housing 122. To elaborate, the differential housing 122 may include interior recesses 408 which are shaped to mate with the outer races. However, other differential housing designs may be used, in other examples.

In FIG. 4, the body 337 of the pinion input flange 112 is again depicted. As previously discussed, the body 337 is in contact with the outer circumferential surface 342 of the pinion gear shaft 120, in the illustrated example. Further, the pinion input flange 112 is positioned exterior to the differential housing 122 which allows the sensors, discussed in greater detail herein with regard to FIG. 5, to be quickly and efficiently installed during manufacturing, servicing, etc. To elaborate, the flange 112 is positioned external to an enclosure formed between the differential housing 122 and the axle shaft housing 128 that encloses the differential 300, shown in FIG. 3.

Further, as shown in FIG. 4, a retaining ring 410 and/or a nut 412 may be coupled to an outboard end 414 of the angled pinion gear 118 to securely and removably attach the pinion input flange 112 to the shaft 120 of the pinion gear. However, the flange may be coupled to pinion gear using other suitable techniques.

FIG. 5 shows a detailed view of the pinion input flange 112 and the group of sensors 328 and 336. As shown in the example illustrated in FIG. 5 the displacement sensor 328 is directly coupled to the body 337 of the pinion input flange 112 and the angular speed sensor 336 circumferentially surrounds and is directly coupled to the displacement sensor. However, the sensors may be positioned in other suitable locations, in alternate examples.

Figure 6:
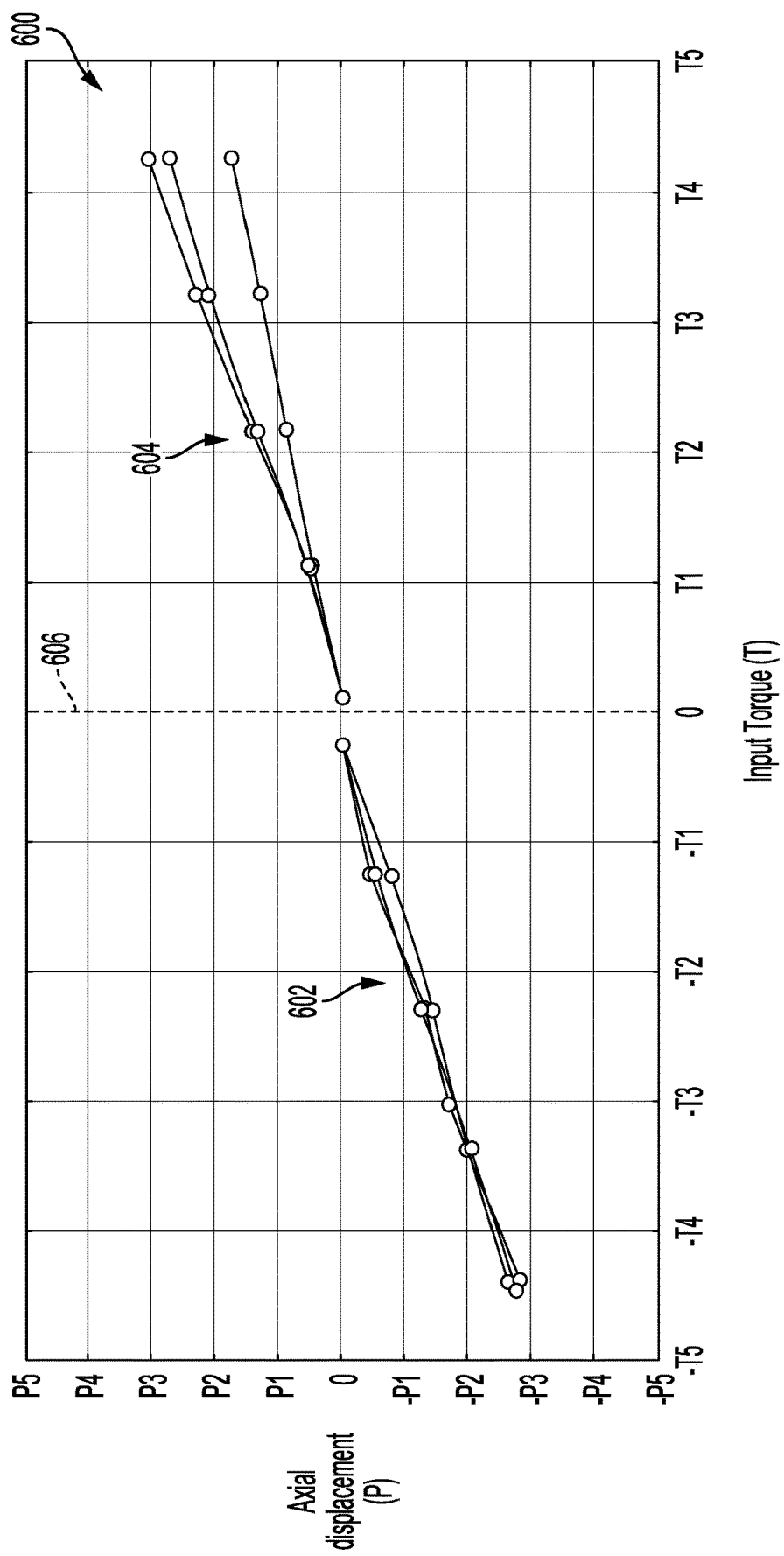
FIG. 6 shows an exemplary graph which denotes a use-case correlation between an axial displacement of a pinion input flange and a torque applied to the flange.

Referring to FIG. 6, several prophetic use-case correlations between the axial displacement between the differential housing and the pinion input flange and torque are represented via a graph 600. The drive axle systems and particularly the controllers described herein may use this type of correlation between axial displacement and torque in a control strategy that uses torque and in some cases power as parameters used to determine adjustment of different controllable components in the powertrain such as the prime mover, braking system, and the like. In practice, the correlation between torque and axial displacement in relation to different operating conditions (e.g., a drive condition, a coast condition, a locked differential condition, an unlocked differential condition, etc.) may be stored in look-up tables and/or other suitable data structures in the controller.

Torque (T) is indicted on the abscissa and increases from left to right. Axial displacement (P) is indicated on the ordinate and increases from bottom to top. Zero values are provided on both the ordinate and abscissa, although specific numerical positive and negative values for the torque (T) and axial displacement (P) are not provided.

Plots 602 indicate the correlation between torque and axial displacement during coast conditions. Conversely, plots 604 indicate the correlation between torque and axial displacement during drive conditions. Line 606 demarcates the boundary between the coast condition and the drive condition.

Further, a use-case method for determining the relationship between the axial displacement between the pinion input flange and the differential housing is provided below. This strategy may be carried out on a test bench prior to integration of the set of sensors into a vehicle platform, in specific example. However, it will be understood, that a variety of suitable procedures may be used to ascertain the relationship between axial displacement and torque prior to use of the drive axle system described herein. For instance, the correspondence may be determined in a modeling program. Further, it will be appreciated that this strategy may be implemented in any of the drive axle systems described herein or combinations of the drive axle systems.

In the use-case method for determining the correlation between torque and axial displacement, zero values on all of the test benches digital indicators may be set to zero at the same time using a controller area network (CAN) signal. Next the system may be put into rotation without torque. Next the system may be stabilized in the zero torque condition for a predetermined period of time (e.g., at least three gear rotations or 10 seconds, in different examples). Next, the torque in the system may be slowly ramped up to a predetermined value (e.g., 25% in one specific use-case example). Next, the system may be sustained in the ramped up torque condition for a predetermined amount of time (e.g., at least three gear rotations or 10 seconds, in different examples). The method may then include multiple torque ramp up and hold steps similar to the previous steps. The method may further include steps where the torque is ramped down by predetermined values and then held at that value for predetermined time periods (converse to the ramp up and hold steps) until the torque reaches zero. This cycle may be repeated a predetermined number of times in both a forward direction (e.g., drive side) and a reverse direction (coast side) with the differential locked as well as unlocked. From this data, coefficients between the axial displacement and the torque for these different operating conditions may be determined. The correspondence between the coefficients and the operating conditions may be stored in look-up tables and/or other suitable data structures. However, other suitable techniques may be used to determine the correlation between torque and axial displacement.

Figure 7:
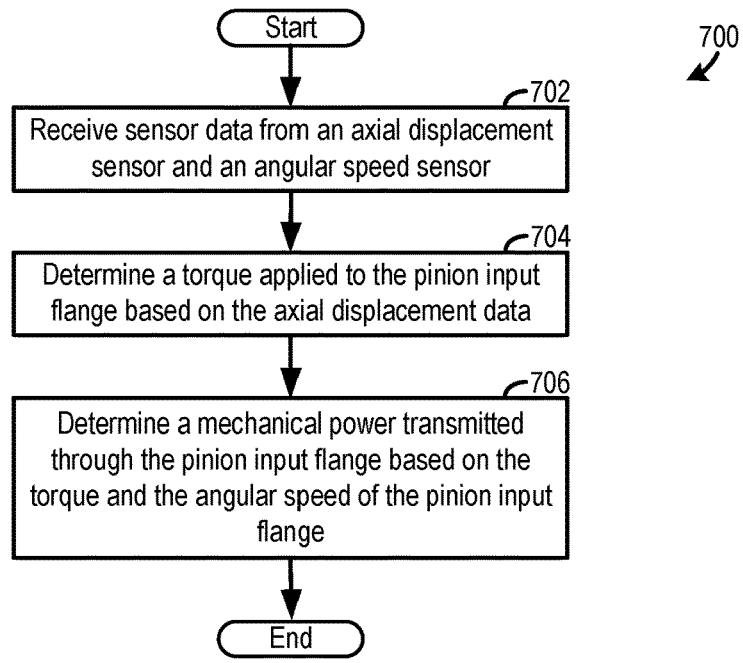
FIG. 7 shows a method for operation of a drive axle system.

FIG. 7 illustrates a method 700 for operation of a drive axle system. The method may specifically be used to determine mechanical power transmitted to the drive axle which may then be used in other vehicle control schemes. The method 700 as well as the other control schemes, control techniques, methods, etc. described herein may be implemented via any of the drive axle systems and vehicles or combinations of the drive axle systems and vehicles described herein. However, in other examples, the control schemes and/or the other control techniques, methods, etc. described herein may be implemented by other suitable drive axle systems and/or vehicles.

At 702 the method includes receiving sensor data from the axial displacement sensor and the angular speed sensor. For instance, data indicative of an axial displacement between a pinion gear input flange and a differential housing may be sent to the controller from the axial displacement sensor and data indicative of the flange's angular speed may also be sent to the controller from the angular speed sensor. As previously discussed, both of these sensors may be coupled to the flange.

At 704, the method includes determining a torque applied to the pinion input flange based on the axial displacement data received from the axial displacement sensor. For instance, a look-up table or other data set storing the predetermined correlation between axial displacement and torque may be used to make such a determination.

At 706, the method includes determining a mechanical power transmitted through the pinion input flange based on the torque determined at step 704 and the angular speed of the pinion input flange. For instance, the angular speed and the torque may be multiplied to calculate the mechanical power. The method may further include operating the drive axle system and/or powertrain based on the mechanical power which is determined at step 706. To elaborate, the prime mover output speed may be adjusted based on the mechanical power determination. For instance, the prime mover output may be increased in response to the mechanical power falling below a target value and vice versa. In other examples, Method 700 enables torque and power applied to the pinion input flange and the pinion gear correspondingly to be efficiently determined using a group of sensors that can be effectively and efficiently installed in a wide variety of vehicles.

The technical effect of the drive axle system operating methods described herein is to more efficiently calculate mechanical power transmitted to a drive axle to increase the control system's computing efficiency using a sensor system that can be more easily incorporated into a wide variety of vehicles.

FIGS. 1-5 are drawn approximately to scale, aside from the schematically depicted components. However, other relative component dimensions may be used, in other embodiments.

FIGS. 1-5 show example configurations with relative positioning of the various components. If shown directly contacting each other, or directly coupled, then such elements may be referred to as directly contacting or directly coupled, respectively, at least in one example. Similarly, elements shown adjacent or contiguous to each other may be adjacent or contiguous to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown below/above one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. As used herein, the term "substantially" may be construed to mean plus or minus five percent or less of the range or value unless otherwise specified.

The invention will be further described in the following paragraphs. In one aspect, a drive axle system is provided that comprises a displacement sensor coupled to a pinion input flange and configured to generate axial displacement data that corresponds to the pinion input flange, wherein the pinion input flange is directly coupled to an angled pinion gear; and a controller including instructions stored in memory that when executed cause the controller to: determine a torque at the pinion input flange based on the axial displacement data; wherein the pinion input flange is positioned external to a differential housing. In one example, the pinion input flange may include a body that circumferentially surrounds a shaft of the angled pinion gear. In another example, the drive axle system may further comprise an angular speed sensor coupled to the pinion input flange and configured to generate angular speed data associated with the pinion input flange, wherein the angled pinion gear meshes with a ring gear in a differential. In yet another example, the controller may include instructions stored in the memory that when executed cause the controller to: determine a power transmitted through the pinion input flange based on the torque and the speed of the pinion input flange. In another example, the angular speed sensor may circumferentially surround the displacement sensor. In another example, the pinion input flange may be positioned outboard of a bearing that is coupled to a shaft of the angled pinion gear. In yet another example, the bearing may be a thrust bearing. Still further in another example, the pinion input flange may be configured to rotationally couple to a drive shaft. In yet another example, the drive shaft may be rotationally coupled to an internal combustion engine. In yet another example, the drive shaft may be rotationally coupled to a traction motor. In another example, the differential housing may be directly coupled to an axle shaft housing. In another example, the drive axle system may be a steering axle.

In another aspect, a method for operating a drive axle system is provided that comprises receiving axial displacement data from a displacement sensor which is coupled to a pinion input flange; and determining a torque applied to the pinion input flange based on the axial displacement data; wherein the drive axle system includes: the displacement sensor; and the pinion input flange which is directly coupled to an angled pinion gear. In one example, the method may further comprise determining an angular speed of the pinion input flange based on angular speed data from an angular speed sensor that is directly coupled to the pinion input flange. In another example, the method may further comprise determining a power transmitted through the pinion input flange based on the torque and the angular speed of the pinion input flange. Further, in one example, the pinion input flange may include a body that circumferentially surrounds a shaft of the angled pinion gear. Still further, in one example, the pinion input flange may be positioned outboard of a thrust bearing that is coupled to a shaft of the angled pinion gear.

In yet another aspect, a drive axle system is provided that comprises a displacement sensor coupled to a pinion input flange and configured to generate axial displacement data that corresponds to the pinion input flange, wherein the pinion input flange is directly coupled to an angled pinion gear that meshes with a ring gear of a differential; an angular speed sensor coupled to the pinion input flange and configured to generate angular speed data that corresponds to the pinion input flange, wherein the angled pinion gear meshes with a ring gear in a differential; and a controller including instructions stored in memory that when executed cause the controller to: determine a power transmitted through the pinion input flange based on the axial displacement and the angular speed of the pinion input flange; wherein the pinion input flange is positioned external to a differential housing. Further, in on example, the pinion input flange may include a body that circumferentially surrounds a shaft of the angled pinion gear. Still further in one example, the drive axle system may further comprise two opposing thrust bearings are coupled to the shaft of the angled pinion gear.

In another representation, an axle assembly is provided that includes a pair of sensors positioned external to an axle housing that encloses a differential and axle shafts, the pair of sensors includes a displacement sensor which generates data indicative of axial movement of a pinion input flange and a speed sensor which generates data indicative of the rotational speed of the pinion input flange and a controller configured to determine a torque applied to the pinion input flange based on the axial movement of the pinion input flange and determine a mechanical power transmitted through the pinion input flange based on a product of the torque and the rotational speed.

The control methods and routines disclosed herein may be stored as executable instructions in non-transitory memory and may be carried out by a drive axle system or vehicle system that includes the controller in combination with the various sensors and actuators. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the system, where the described actions are carried out by executing the instructions in a system including the various hardware components in combination with the electronic controller. One or more of the method steps described herein may be omitted if desired.

It is to be understood that the invention may assume various alternative orientations and step sequences, except where expressly specified to the contrary. It is also to be understood that the assemblies, devices, and methods illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise.

It will be appreciated that the configurations disclosed herein are exemplary in nature, and that these specific examples are not to be considered in a limiting sense, because numerous variations are possible. For example, the above technology can be applied to axle assemblies that include different types of propulsion sources including different types of electric machines and/or combustion engines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention as defined by the claims which follow.

The invention claimed is:

1. A drive axle system, comprising:
    a displacement sensor directly coupled to a pinion input flange and configured to generate axial displacement data that corresponds to the pinion input flange, wherein the pinion input flange is coupled to an angled pinion gear via a shaft;
    an angular speed sensor coupled to the displacement sensor and configured to generate angular speed data associated with the pinion input flange; and
    a controller including instructions stored in memory that when executed cause the controller to:
        determine a torque at the pinion input flange based on the axial displacement data;
    wherein the pinion input flange is positioned external to a differential housing that at least partially surrounds the shaft; and
    wherein the angled pinion gear meshes with a ring gear in a differential.

2. The drive axle system of claim 1, wherein the pinion input flange includes a body that circumferentially surrounds a shaft of the angled pinion gear.

3. The drive axle system of claim 1, wherein the controller includes instructions stored in the memory that when executed cause the controller to:
    determine a power transmitted through the pinion input flange based on the torque and the speed of the pinion input flange.

4. The drive axle system of claim 1, wherein the angular speed sensor circumferentially surrounds the displacement sensor.

5. The drive axle system of claim 1, wherein the pinion input flange is positioned outboard of a bearing that is coupled to a shaft of the angled pinion gear.

6. The drive axle system of claim 5, wherein the bearing is a thrust bearing.

7. The drive axle system of claim 1, wherein the pinion input flange is configured to rotationally couple to a drive shaft.

8. The drive axle system of claim 7, wherein the drive shaft is rotationally coupled to an internal combustion engine.

9. The drive axle system of claim 7, wherein the drive shaft is rotationally coupled to a traction motor.

10. The drive axle system of claim 1, wherein the differential housing is directly coupled to an axle shaft housing.

11. The drive axle system of claim 1, wherein the drive axle system is a steering axle that includes a steering assembly with a steering cylinder and steering linkage that mechanically attaches the steering cylinder to multiple hub assemblies.

12. A method for operating a drive axle system, comprising:
    receiving axial displacement data from a displacement sensor which is directly coupled to a pinion input flange; and
    determining a torque applied to the pinion input flange based on the axial displacement data;
    wherein the drive axle system includes:
        the displacement sensor; and
        the pinion input flange which is coupled to an angled pinion gear via a shaft;
    wherein the pinion input flange is positioned external to a differential housing that at least partially surrounds the shaft; and
    wherein the angled pinion gear meshes with a ring gear in a differential.

13. The method of claim 12, further comprising determining an angular speed of the pinion input flange based on angular speed data from an angular speed sensor that is directly coupled to the pinion input flange.

14. The method of claim 13, further comprising determining a power transmitted through the pinion input flange based on the torque and the angular speed of the pinion input flange.

15. The method of claim 12, wherein the pinion input flange includes a body that circumferentially surrounds a shaft of the angled pinion gear.

16. The method of claim 15, wherein the pinion input flange is positioned outboard of a thrust bearing that is coupled to the shaft of the angled pinion gear.

17. A drive axle system, comprising:
    a displacement sensor directly coupled to a pinion input flange and configured to generate axial displacement data that corresponds to the pinion input flange, wherein the pinion input flange is coupled to an angled pinion gear via a shaft, wherein the angled pinion gear meshes with a ring gear of a differential;

an angular speed sensor coupled to the displacement sensor and configured to generate angular speed data that corresponds to the pinion input flange, wherein the angled pinion gear meshes with the ring gear in the differential;

wherein the pinion input flange is positioned external to a differential housing that at least partially surrounds the shaft; and a controller including instructions stored in memory that when executed cause the controller to:
  determine a power transmitted through the pinion input flange based on the axial displacement and the angular speed of the pinion input flange;

wherein the pinion input flange is positioned external to a differential housing.

18. The drive axle system of claim 17, wherein the pinion input flange includes a body that circumferentially surrounds a shaft of the angled pinion gear.

19. The drive axle system of claim 18, further comprising two opposing thrust bearings are coupled to the shaft of the angled pinion gear.

* * * * *